(12) United States Patent
Zadaka et al.

(10) Patent No.: US 11,866,190 B2
(45) Date of Patent: Jan. 9, 2024

(54) REMOVABLE FLOOR SYSTEM WITH AUXILIARY FUEL TANKS FOR AN AIRCRAFT

(71) Applicant: ISRAEL AEROSPACE INDUSTRIES LTD., Lod (IL)

(72) Inventors: Iftach Zadaka, Rishon le Zion (IL); Yossi Guetta, Bat Yam (IL); Uri Pinhasi, Katzir (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 68 days.

(21) Appl. No.: 17/252,898

(22) PCT Filed: Jun. 18, 2019

(86) PCT No.: PCT/IL2019/050678
§ 371 (c)(1),
(2) Date: Dec. 16, 2020

(87) PCT Pub. No.: WO2019/244150
PCT Pub. Date: Dec. 26, 2019

(65) Prior Publication Data
US 2021/0316876 A1    Oct. 14, 2021

(30) Foreign Application Priority Data
Jun. 20, 2018    (IL) .......................................... 260172

(51) Int. Cl.
*B64D 37/04*    (2006.01)
*B64C 1/18*    (2006.01)
(Continued)

(52) U.S. Cl.
CPC ................ *B64D 37/04* (2013.01); *B64C 1/18* (2013.01); *B64C 27/04* (2013.01); *B64D 37/08* (2013.01); *B64D 37/32* (2013.01)

(58) Field of Classification Search
CPC ........ B64D 37/04; B64D 37/08; B64D 37/32; B64D 37/14; B64C 1/18
See application file for complete search history.

(56) References Cited

U.S. PATENT DOCUMENTS

| 4,989,809 A | 2/1991 | Arnold |
| 2008/0264951 A1* | 10/2008 | Tweet .................... B64D 37/06 220/560.02 |

(Continued)

FOREIGN PATENT DOCUMENTS

| CA | 2876817 A1 | 6/2016 |
| CA | 2920680 A1 | 9/2016 |

(Continued)

OTHER PUBLICATIONS

Joan Kleynhans, Transatlantic Cessna 150, Nov. 1996, Aero Africa Magazine published Nov. 1996. Found at [cessna150-152club.com/Transatlantic-Cessna-150] (Year: 1996).*

(Continued)

*Primary Examiner* — Timothy D Collins
*Assistant Examiner* — Justin Michael Heston
(74) *Attorney, Agent, or Firm* — Dorsey & Whitney LLP (57) ABSTRACT

A floor system designed for use with an aircraft is provided. The aircraft comprises a cabin characterized by a first capacity defined by the number of personnel in a predetermined position which may be accommodated therein, and comprises an auxiliary fuel port. The floor system is configured to be detachably installed within the cabin and comprises one or more top panels constituting, when the floor system is installed in the aircraft, a floor of the cabin, and one or more fuel tanks disposed below the top panels and defining an internal space for containing liquid fuel there within. At least one of the fuel tanks is configured for connection to the auxiliary fuel port for supplying the fuel to the aircraft. The cabin with the floor system installed therein (Continued)

is characterized by a second capacity being equal to the first capacity.

34 Claims, 3 Drawing Sheets

(51) Int. Cl.
    *B64D 37/08*     (2006.01)
    *B64D 37/32*     (2006.01)
    *B64C 27/04*     (2006.01)

(56) References Cited

U.S. PATENT DOCUMENTS

| | | | |
|---|---|---|---|
| 2009/0044866 A1* | 2/2009 | Pearson | F02M 37/18 |
| | | | 137/87.01 |
| 2011/0147530 A1 | 6/2011 | Rahman et al. | |
| 2011/0272526 A1* | 11/2011 | Barbosa | B64C 17/10 |
| | | | 244/135 R |
| 2012/0126057 A1 | 5/2012 | Huber et al. | |
| 2013/0068878 A1* | 3/2013 | Liardon | B64C 27/006 |
| | | | 244/17.23 |
| 2015/0102040 A1 | 4/2015 | Bornes | |
| 2015/0107682 A1* | 4/2015 | Kirk | B64C 1/20 |
| | | | 137/376 |
| 2015/0136906 A1* | 5/2015 | Fink | B64D 37/06 |
| | | | 244/119 |
| 2015/0307178 A1* | 10/2015 | Fink | B64C 1/061 |
| | | | 244/119 |
| 2017/0313434 A1* | 11/2017 | Peryea | B64D 37/04 |
| 2018/0244397 A1* | 8/2018 | Carr | B64D 37/06 |

FOREIGN PATENT DOCUMENTS

| | | |
|---|---|---|
| CN | 101346280 A | 1/2009 |
| CN | 105934388 A | 9/2016 |
| DE | 3049429 A1 | 7/1982 |
| JP | 2016145031 A | 8/2016 |
| KR | 20160085167 A | 7/2016 |
| RU | 2011118239 A | 11/2012 |

OTHER PUBLICATIONS

Wikipedia, Ferry Tank, Feb. 15, 2018, [web.archive.org/web/20180215112233/https://en.wikipedia.org/wiki/Ferry_tank] (Year: 2018).*
Turtlepac, Apr. 19, 2017, [web.archive.org/web/20170419103746/https://www.turlepac.com/photo-gallery/aircraft-ferry-tanks/] (Year: 2017).*
Maine Aero Services, Tanking, May 18, 2012, [web.archive.org/web/20120518212033/http://www.maineaero.com/index.php?id=15&sub_id=27] (Year: 2012).*
Atitank, Dot Approved Refueling Tanks, Feb. 28, 2018, [web.archive.org/web/20180228083716/http://atitank.com/products/dot-refueling-tanks/ (Year: 2018).*
RefuelingTanksnew, ATI Tank, [http://atitank.com/wp-content/uploads/2017/12/RefuelingTanksNEW.pdf] (Year: 2017).*

\* cited by examiner

REMOVABLE FLOOR SYSTEM WITH AUXILIARY FUEL TANKS FOR AN AIRCRAFT

TECHNOLOGICAL FIELD

The presently disclosed subject matter relates to accessories for aircraft, and in particular to accessories for use within cabins thereof.

BACKGROUND

Helicopters are characterized by an operational range, i.e., the distance they may travel, for example to carry out a mission, which is largely determined based on its flight weight and the amount of fuel it carries. Auxiliary fuel tanks are often provided to increase this range.

Often, for example in combat scenarios, one or more auxiliary fuel tanks are installed. In general, the auxiliary fuel tanks are provided either as externally-mounted pods, or within the cabin of the helicopter. Installing the tanks externally typically requires expensive infrastructure, and may negatively impact the maneuverability of the helicopter. Installing the tanks within the cabin in general allows more auxiliary fuel to be carried than with an externally-installed tank, but may significantly reduce the amount of space within the cabin available for personnel and/or other cargo.

SUMMARY

According to one aspect of the presently disclosed subject matter, there is provided a floor system designed for use with an aircraft, the aircraft comprising a cabin characterized by a first capacity defined by the number of personnel in a predetermined position which may be accommodated therein, the aircraft further comprising an auxiliary fuel port, the floor system being configured to be detachably installed within the cabin and comprising:
  one or more top panels constituting, when the floor system is installed in the aircraft, a floor of the cabin; and
  one or more fuel tanks disposed below the top panels and defining an internal space for containing liquid fuel therewithin, at least one of the fuel tanks being configured for connection to the auxiliary fuel port for supplying the fuel to the aircraft;
wherein the cabin with the floor system installed therein is characterized by a second capacity being equal to the first capacity.

The floor system may comprise two or more of the fuel tanks, the fuel tanks being configured to be connected to one another such that their contents are in fluid communication.

The floor system may further comprise a connection arrangement configured to cooperate with the auxiliary fuel port to operationally connect the floor system thereto, thereby facilitating the supply of fuel.

The connection arrangement may comprise a conduit extending therefrom.

The connection arrangement may comprise a pump configured to force fuel contained within the floor system toward the auxiliary fuel port.

One or more of the fuel tanks may comprise an inner liner configured to self-seal in the event of puncture.

The top panel may comprise at least one armor layer.

The floor system may further comprise one or more bottom panels opposite the top panels, the bottom panels comprising at least one armor layer.

The armor layer may comprise a plurality of elements made of a refractory material.

The armor layer may comprise a layer made of a high density material.

The floor system may further comprise a spall liner adjacent to the armor layer.

An interior of each of at least some of the fuel tanks may comprise a plurality of partitions, dividing the interior into sections.

The partitions may be configured to at least partially support the top panel.

The partitions may comprise openings configured to fluidly connect at least some adjacent sections.

At least some of the openings may be configured to be selectively opened and closed.

At least some of the openings may comprise check valves.

The floor system may comprise controllable valves within the openings to selectively open and close them.

One of the sections may constitute a supply section from which fuel is drawn directly for supply to the auxiliary fuel port. The horizontal cross-sectional area of the supply section may smaller than the those (i.e., the horizontal cross-sectional areas) of the sections adjacent thereto. The horizontal cross-sectional area of the supply section may be smaller than those of most of the other sections.

The floor system may be configured to determine the amount of fuel drawn therefrom.

The floor system may further comprise a controller configured to direct operation thereof.

The predetermined position may be a sitting position.

The height of the floor system may be such that it does not exceed one quarter the width thereof.

The height of the floor system may be such that it does not exceed about 15% of the height of the cabin.

The auxiliary fuel port may be located within the cabin.

The aircraft may be a helicopter.

According to another aspect of the presently disclosed subject matter, there is provided a method of loading an aircraft with fuel and personnel, the aircraft comprising a cabin characterized by a first capacity defined by the number of personnel in a predetermined position which may be accommodated therein, the aircraft further comprising an auxiliary fuel port disposed within the cabin, the method comprising:
  providing a floor system as described above;
  detachably installing the floor system to a floor of the cabin;
  providing fuel within the fuel tanks;
  detachably installing the floor system to a floor of the cabin;
  connecting the fuel tanks to the auxiliary fuel port; and
  loading personnel into the cabin;
  wherein the personnel are standing and/or seated on the floor system.

According to a further aspect of the presently disclosed subject matter, there is provided a cabin of an aircraft, and a floor system as described above being detachably installed therewithin.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
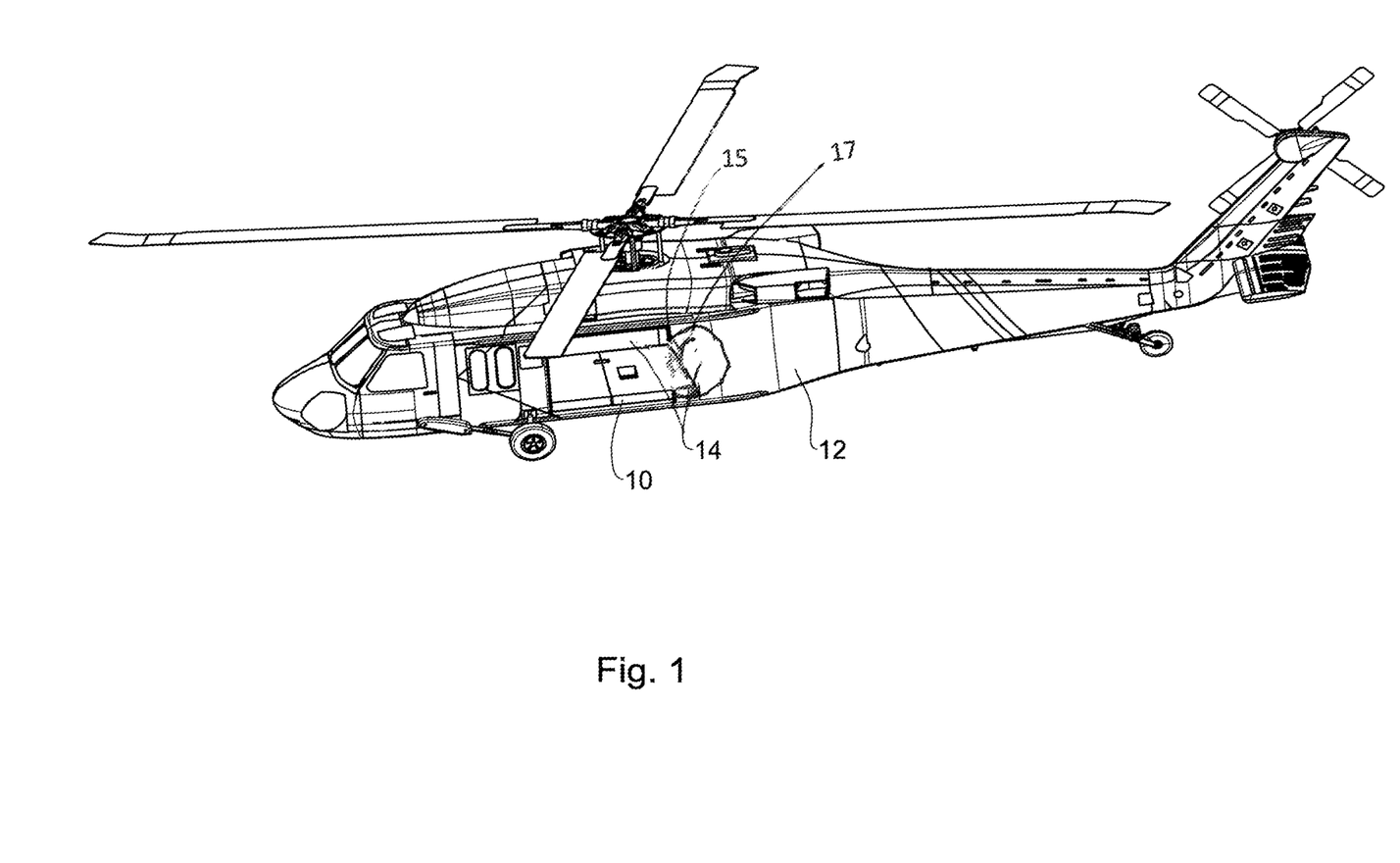
FIG. 1 is a perspective partial cut-out view of a helicopter with a floor system according to the presently disclosed subject matter installed therein.

As illustrated in FIG. 1, there is provided a floor system, which is generally indicated at 10, configured for use with a helicopter 12. The helicopter comprises a cabin 14, which may be designed for carrying personnel therewithin. The cabin is characterized by a capacity, which may be defined as the maximum number of personnel (e.g., soldiers) which may be accommodated therein when in a given position, for example a sitting position.

It will be appreciated that while the capacity of the cabin 14 may be expressed, as described above, in terms of a maximum number of seated personnel, this formulation is merely a useful way of describing the area of the floor of the cabin 14 which is available for such a use; two cabins having floors of slightly different areas may have the same capacity if they are each suitable to accommodate the same maximum number of personnel. In addition, the two areas may be considered to be substantially the same.

The helicopter 12 comprises an integrated fuel tank (not illustrated), and is configured to facilitate supplying fuel stored therein directly to an engine for operation thereof. The helicopter 12 further comprises an auxiliary fuel port 17, which may be disposed within the cabin 14, and which provides access to the integrated fuel tank in order to allow an auxiliary fuel tank to supply fuel thereto.

The floor system 10 disclosed herein and recited in the appended claims is designed for specific use with a particular model of helicopter 12; accordingly, it may be configured for use therewith taking into account relevant parameters of the helicopter, which may include, but are not limited to, height and/or configuration of the cabin 14, the location of the auxiliary fuel port 17, harnessing points, access points, etc.

Figure 2:
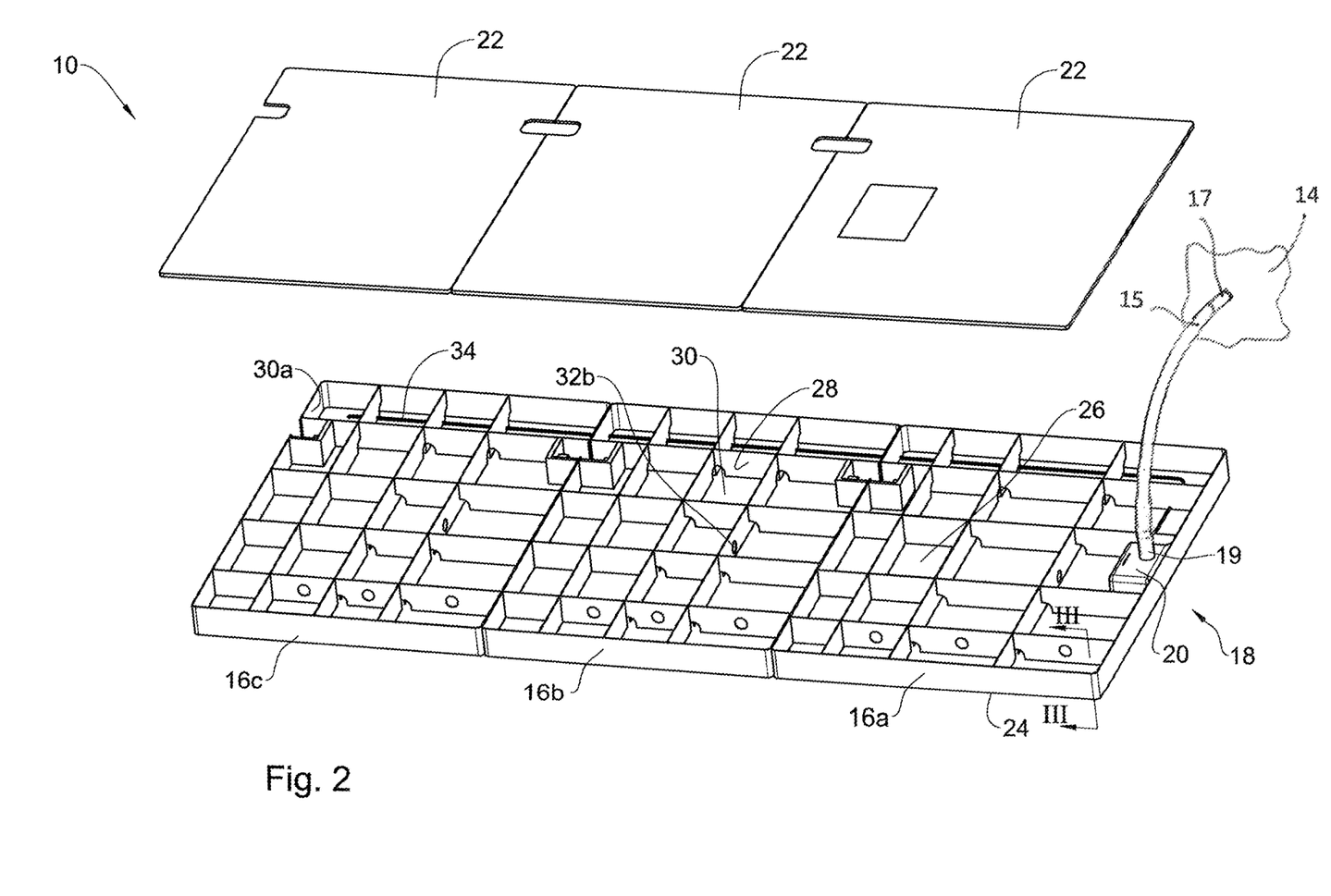
FIG. 2 is a perspective view of a floor system as illustrated in FIG. 1, with a top panel thereof removed.

As illustrated in FIG. 2, the floor system 10 defines an internal space therewithin configured for holding liquid fuel, and is configured for being detachably installed within a cabin 14 of the helicopter 12. It will be appreciated that in the present disclosure, the term detachably installed is to be understood as being temporarily fitted within the cabin 14, for example for the duration of a mission, e.g., using a restraint device or mechanism provided therein for cargo restraint, including, but not limited to, tie-down rings, hooks, posts, brackets, etc.

The floor system 10 comprises one or more fuel tanks, for example a rearmost fuel tank 16a, a middle fuel tank 16b, and a frontmost fuel tank 16c (elements indicated by similar reference numerals, but distinguished by a suffix or other similar notation, such as 16a, 16b, 16c, may be referred to collectively using only the reference numeral, without the suffix or notation). Herein the presently disclosed subject matter, including the appended claims, the term fuel tank is used to refer to elements of the floor system described herein with reference to and indicated at 16, while the term integrated fuel tank is used to refer to that fuel tank which is provided as a permanent integrated component of the helicopter, typically by its manufacturer, to be accessed by a user only during maintenance operations.

The floor system 10 may be configured such that the fuel tanks 16 are modular, i.e., one or more of the fuel tanks may be optionally installed or not, depending on requirements (e.g., the rearmost fuel tank 16a may be installed by itself, the rearmost and middle fuel tanks 16a, 16b may be installed without the frontmost fuel tank 16c, or all three may be installed). Each of the fuel tanks 16 may be configured to be connected to another one or more of the fuel tanks, e.g., to an adjacent fuel tank, such that the contents of both are in fluid communication with one another. This may be accomplished by one or more corresponding pairs of openings, valves, conduits, etc., or by any other suitable arrangement.

While providing several fuel tanks 16 may have certain advantages, for example providing flexibility in the amount of fuel provided by the floor system 10, providing lighter elements, especially when the fuel tanks 16 are full, facilitating easier installation and/or detachment, etc., the floor system may comprise a single fuel tank, for example covering substantially the entire floor area of the cabin 14.

It will be appreciated that, unless otherwise clear from context, herein the specification and appended claims, references to a fuel tank may also be understood as a reference to the floor system (including, but not limited to, examples wherein the floor system comprises a single fuel tank), and references to the floor system may also be understood as a reference to one or more of the fuel tanks, mutatis mutandis.

It will be further appreciated that herein the disclosure and the appended claims, terms relating to direction, such as front, rear, top, bottom, etc., and similar/related terms are used with reference to the orientation in the accompanying drawings based on a typical usage of the floor system 10 and its constituent elements, unless indicated otherwise or clear from context, and is not to be construed as limiting.

According to some examples, the rearmost fuel tank 16a comprises a connection arrangement 18, configured to cooperate with the auxiliary fuel port 17 of the helicopter 12 to operationally connect the floor system 10 thereto, i.e., to bring it into fluid communication with the integrated fuel tank of the helicopter. The connection arrangement 18 may comprise a conduit 19 extending therefrom, and/or a suitable connector 15 for connecting to the auxiliary fuel port 17 of the helicopter 12. The connection arrangement 18 may further comprise a pump 20 connected to the conduit 19, configured to force fuel contained within the floor system 10 to the integrated fuel tank of the helicopter 12 via its auxiliary fuel port 17.

The connection arrangement 18 may be configured to facilitate determining the amount of fuel which remains in the floor system 10. This may be accomplished by any suitable method, for example by tracking the amount of fuel which supplied to the helicopter 12, etc.

It will be appreciated that the connection arrangement 18 may be provided at any suitable location and/or on any other of the fuel tanks 16, and may be of any suitable design, at least partially based on the parameters of the helicopter 12 for which the floor system 10 is designed for use therewith, and in particular the location and/or configuration of its auxiliary fuel port 17, mutatis mutandis.

Each of the fuel tanks 16 comprises top and bottom panels 22, 24. The top panel 22 of each may define a generally planar surface, and the bottom panel 24 may be configured to match a floor of the cabin 14 of the helicopter, or a portion thereof. The floor system 10 may comprise a single top panel 22 for all of its fuel tanks or one top panel for each.

Similarly, it may comprise a single bottom panel 24 for all of its fuel tanks or one bottom panel for each.

The floor system 10 has a low profile, e.g., its height is very small with relation to its width (in the side-to-side and/or front-to-back directions). It will be appreciated that in the presently disclosed subject matter as well as in the appended claims, reference to the height of the fuel system refer to the distance from the top panel 22 to the bottom panels 24 unless otherwise clear from context, and excludes any element which may protrude vertically therefrom, such as parts of the connection arrangement 18, etc.

According to some examples, the height of the floor system is no more than about one quarter its width in any direction. According to some examples, its height is no greater than about 16 cm along most of the area of the top panel 22. According to other examples, its height along most of the area of the top panel 22 is no greater than about 12 cm. According to other examples, the height along most of the area of the top panel 22 is no greater than about 15% of the height of the cabin 14, in the corresponding location. According to other examples, the height along most of the area of the top panel 22 is no greater than about 10% of the height of the cabin 14, in the corresponding location. Accordingly, when the floor system 10 is installed within the cabin 14 of the helicopter 12, the top panel 22 may constitute a floor, or a portion of a floor, of the cabin, i.e., the height of the vertical space thereabove being sufficient to accommodate personnel standing and/or sitting thereupon (for example upon an improvised seat, such as a backpack, etc.), for loading thereupon cargo, etc.

The top and/or bottom panel 22, 24 may be armored, i.e., it is provided with and/or constitutes an armor layer. According to some examples, it provides protection against one or more threats, including, for example armor piercing projectiles, fragmentation explosives, etc. It may also provide protection, e.g., according to examples wherein the top panel 24 is armored, against accidental damage to the floor system 10 caused by objects brought into the cabin 14 by personnel (for convenience, such objects are included in this context within the term threat). The armored panel 22, 24 may comprise one or more layers made of a high density material (such as high hardness steel), pellets and/or tiles made of a refractory material (such as ballistic ceramic), etc., depending on the threat(s) against which it is designed to protect. It may further comprise a spall liner (not illustrated), to provide protection from fragments which may be generated during impact of the threat. According to some examples, a separate armor layer is provided adjacent the armored panel 22, 24, either above or below it depending on the nature of the threat against which it is designed to protect. According to other examples, the armored panel 22, 24 is itself formed with at least some or all of the armor layer, e.g., being made of a made of a material and/or design which provides ballistic protection.

Figure 3:
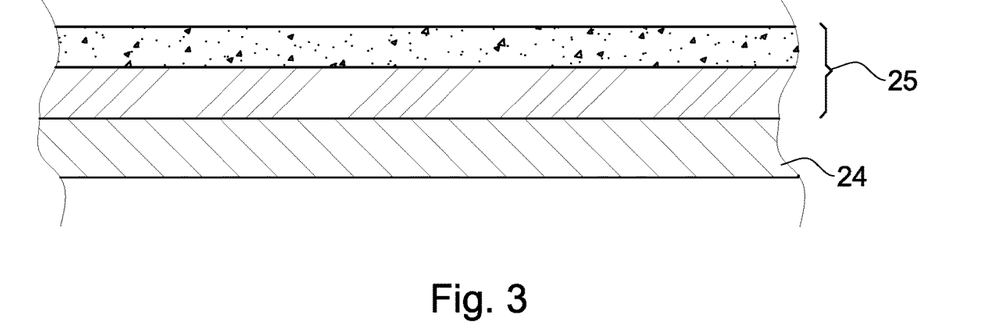
FIG. 3 is a partial cross-sectional view taken along line in FIG. 2.

According to some examples, for example as illustrated in FIG. 3, the floor system 10 may comprise an inner liner 25. It will be appreciated that while the inner liner 25 is illustrated adjacent the bottom panel 24, it may be provided at any suitable location(s) of the interior of the fuel tanks 16. The inner liner 25 is configured to be self-sealing in the event of puncture, for example arising from an impact of a light-arms projectile. The inner liner may be provided according to any suitable arrangement, many of which are well-known in the art, for example comprising several layers of elastomeric material and reinforcing fabric.

One or more of the fuel tanks 16 may be formed with a passageway 26 passing therethrough, for example to provide access to an element of the helicopter 12, e.g., a cargo hook, located in registration therebeneath when the floor system 10 is installed therein. A cover (not illustrated) may be optionally provided to close the passageway when not in use.

The interior of the fuel tanks 16 may comprise a plurality of partitions 28, thereby dividing it into sections 30. In addition, the partitions may be configured to support the top panel 22, thereby imparting additional strength thereto, to support personnel and/or other cargo thereupon.

The partitions 28 may be provided with one or more openings 32, thereby permitting fuel therewithin to flow among the different sections 30, in particular when the fuel tanks 16 are only partially full (when they are full, the fuel will be evenly distributed therewithin). It will be appreciated that not all adjacent sections 30 are necessarily connected by openings 32. This arrangement may facilitate maintaining a more consistent level of fuel within each of the fuel tanks 16, for example as the helicopter 12 changes its angle with respect to the ground, than would occur if the interior of the fuel tank 16 was formed, e.g., as an open space without such partitions. Accordingly, such partitions 28 facilitate decreasing the weight imbalance which may result from fuel sloshing about within the fuel tanks 16 during flight. The openings 32 may be at any suitable height, for example adjacent the bottom panel 24 (such as indicated at 32*a*), at a distance therefrom (such as indicated at 32*b*), etc. The openings 32 may further be formed at any suitable location along the length/width (i.e., in a direction parallel to the bottom panel 24) of the partition 28, for example in the corner of the sections (such as indicated at 32*a*), in the middle (such as indicated at 32*b*), etc.

The floor system 10 may be designed such that fuel is drawn from one of the sections, i.e., a supply section 30*a*. In order to facilitate this, a supply tube 34 may be provided, spanning between the supply section 30*a* and the connection arrangement 18 (for example to the pump 20 thereof) and bringing them into fluid communication with one another. According to some examples, the pump 20 is disposed within the supply section 30*a*, in which case the supply tube 34 may not be necessary. The supply section 30*a* may be located in a location so as to at least partially mitigate, or at least not increase, any imbalance inherent in the helicopter 12 (e.g., if the helicopter is inherently imbalanced toward its rear end, the supply section may be disposed toward a front end of the floor system 10), in particular when the floor system 10 is only partially full, and an even distribution of fuel therein is not possible or practical; a reason for this will be discussed below.

According to some examples, the area (i.e., taken in a horizontal direction) of the supply section 30*a* is smaller than that of most of the other sections 30, e.g., it may have an area no larger than that of most of the other sections. By minimizing the area of the supply section 30*a*, the vertical height of fuel therewithin is increased for any volume of fuel therewithin, thereby increasing the likelihood that there will be a sufficient level of fuel therewithin for the supply tube 34 to withdraw therefrom without intake of air.

It will be appreciated that if the helicopter is tilted in one direction for a sustained amount of time, the imbalance may increase; however, the above-described arrangement slows this result, i.e., lowers the rate of increase of the weight imbalance of the fuel tanks 16, thereby allowing the helicopter 12 to maintain a tilted orientation in a single direction for a longer period of time before the weight imbalance caused by the fuel to present difficulties in flying. Any imbalance would be corrected when the helicopter 12 tilts in the opposite direction. Accordingly, the layout of the partitions 28 may be designed so as to limit the weight imbalance which arises from the fuel within the fuel tanks 16, e.g., taking into account the frequency with which a helicopter 12 typically changes its orientation with respect to the ground during flight. Additionally, the locations of the openings 32 (i.e., the location along the height, length/width, etc., as described above) may be designed so as to give rise to different flow paths (i.e., predetermined paths for the fuel to flow among the sections 30), for example depending on the orientation of the helicopter 12.

Figure 4:
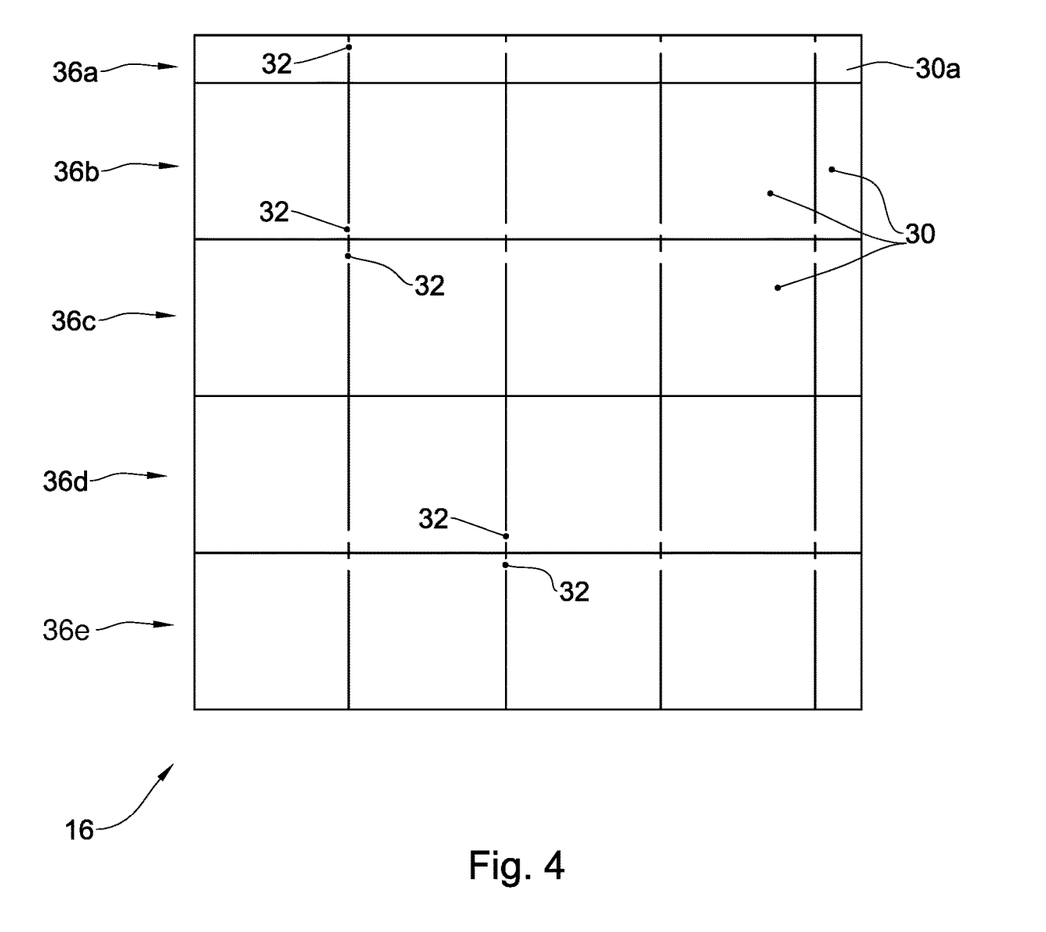
FIG. 4 is a schematic top view of the interior of a fuel tank of the floor system illustrated in FIG. 1.

For example, as illustrated schematically in FIG. 4 (wherein the top of the figure is closest the front of the helicopter 12), the sections 30 of one or more of the fuel tanks 16 may be arranged in rows (e.g., as indicated at 36a-36e). Some of the rows 36, for example alternating rows 36a, 36c, 36e, may comprise sections 30 which are connected to those sections which are sidewardly adjacent thereto by openings 32 which are disposed forwardly, while the other rows 36b, 36d comprise sections which are connected to those sections which are sidewardly adjacent thereto by openings which are disposed rearwardly (for clarity, openings connecting sections which are adjacent front-to-rear from one another are not represented in FIG. 4). Accordingly, when the fuel tank 16 is partially full, when the helicopter 12 is tilted forwardly and to one of the sides, fuel flows between adjacent sections 30 in some of the rows (i.e., 36a, 36c, 36e) in a sideward direction, and significantly less so (if at all) in the other rows (36b, 36d). The opposite is true when the helicopter 12 is tilted rearwardly and to one of the sides. According to this example, the degree of weight imbalance in such situations may be mitigated Similar considerations may be taken into account when designing the locations of openings 32 between adjacent sections 30 which are forwardly/rearwardly adjacent one another.

According to some examples, some or all of the openings 32 may comprise check valves (not illustrated), configured to ensure that fuel flows in only one direction therethrough. Such an arrangement may be used to ensure that fuel flows among the sections 30 along a predetermined path or paths, as defined by the check valves. According to other examples, some or all of the openings 32 may be selectively opened and closed. For example, some or all of the openings may comprise controllable valves, e.g., electrically and/or pneumatically operated. Similarly, such an arrangement may be used to ensure that the fuel flows among the sections 30 along a predetermined path or paths as defined by the controllable valves, with the option of changing the path(s) during use, for example in response to conditions during use. Typically, such a fuel path may be chosen so as to ensure, or increase the likelihood, of one or more predetermined movements of fuel among the sections 30, for example that fuel within the floor system 10 flows toward the supply section 30a as much as possible, that the center of gravity of the fuel is as close as possible to a predetermined location, etc.

According to examples (e.g., as mentioned above) wherein the supply section 30a is located in a location so as to at least partially mitigate any imbalance inherent in the helicopter 12, the openings 32 may be arranged so as to create a fuel path which ensures that fuel flows, as much as possible, towards the supply section, giving rise to a weight imbalance within the floor system in its direction. As the helicopter 12, according to such examples, is imbalanced in an opposite direction, this design of the floor system 10 partially mitigates the imbalance of the helicopter 12.

The floor system 10 may comprise a controller (not illustrated), configured to direct operation thereof. It will be appreciated that while herein the specification and claims, the term controller is used with reference to a single element, it may comprise a combination of elements, which may or may not be in physical proximity to one another, without departing from the scope of the presently disclosed subject matter, mutatis mutandis. In addition, disclosure herein (including recitation in the appended claims) of a controller carrying out, being configured to carry out, or other similar language, implicitly includes other elements of the floor system 10 carrying out, being configured to carry out, etc., those functions, without departing from the scope of the presently disclosed subject matter, mutatis mutandis. Likewise, disclosure herein (including recitation in the appended claims) of elements of the floor system 10 carrying out, being configured to carry out, or other similar language, implicitly includes the controller carrying out, being configured to carry out, etc., those functions, without departing from the scope of the presently disclosed subject matter, mutatis mutandis. It will be further appreciated that the controller and/or other elements of the floor system 10 may facilitate one or more external systems to carry out, be configured to carry out, etc., functions ascribed thereto, without departing from the scope of the presently disclosed subject matter, mutatis mutandis.

The floor system 10 as disclosed herein with reference to and illustrated in the accompanying drawings may have one or more advantages, e.g., over an auxiliary fuel tank configured for being installed within the cabin 14 of a helicopter 12, and being of a different design. For example:

- As the floor system 10 disclosed herein has a very low profile, it may be deployed, effectively without occupying floor space, as its top panel 22 may be used as a floor. Accordingly, installation of the floor system 10 may only slightly impact, if at all, the carrying capacity of the helicopter 12, in particular with respect to the number of personnel it may transport at once.
- As the floor system 10 disclosed herein may comprise an armored top and/or bottom panel 22, 24, a separate armor panel may not be needed. As the weight of the armored floor system 10 may be less than the weight of the floor system 10 in addition to the separate armor panel, this may decrease the total weight of the helicopter 12, thereby increasing its operational range. Similarly, its weight may be less than that of comparable (e.g., in terms of capacity) auxiliary fuel tanks in addition to a separate armor panel.
- Depending on the design of the helicopter 12, and in particular its cabin 14, an auxiliary fuel tank having a height which is taller than that of the floor system 10 disclosed herein may partially obstruct a side of one or more doorways providing entry to the cabin, effectively reducing its width, and thereby restricting, e.g., how fast personnel may exit the helicopter 12. The floor system 10 disclosed herein maintains the full width of the doorway.
- The relatively low geometry of the floor system 10 disclosed herein is less likely than auxiliary fuel tanks of other designs, for example during extreme maneuvering, to contribute towards the development of unsafe forces and/or torques.
- As the weight of the floor system 10 disclosed herein may be distributed over a relatively large percentage of the cabin, it does not introduce a weight imbalance as large as that which would be introduced by an auxiliary fuel tank which is taller, and thus does not extend as far forward (or rearwardly, for example with an auxiliary fuel tank which is disposed toward the front of the cabin). Accordingly, the helicopter 12 carrying the floor system 10 disclosed herein, even when loaded with fuel, may be able to take off without consideration of the occupancy of its cabin 14, i.e., nothing else may be necessary to mitigate any imbalance introduced by the floor system 10 and fuel loaded therein, including, but not limited to, personnel, counterweights, etc.

It will be appreciated that the above is not an exhaustive list, nor is it limiting, i.e., an floor system 10 may be provided according to the presently disclosure which provides other advantages than those listed above, only some of the above-listed advantages, other none of the above-listed advantages, without departing from the scope of the presently disclosed subject matter, mutatis mutandis.

It will be further appreciated that while the above description and the accompanying drawings refer specifically to a helicopter, this shall not be construed as limiting the scope of the presently disclosed subject matter thereto. Accordingly, the floor system 10 may be provided for use with any other suitable type of aircraft, or any other suitable type of vehicle, e.g., land-based or marine, without departing from the scope of the presently disclosed subject matter, mutatis mutandis. Similarly, the floor system 10 may be configured to provide auxiliary power of a different type to a helicopter 12 or other vehicle configured therefor, e.g., electric power, for example comprising batteries below the top panel 22, mutatis mutandis.

It will be still further appreciated that while the above description and the accompanying drawings refer to use with liquid fuel, this shall not be construed as limiting the scope of the presently disclosed subject matter thereto. Accordingly, the floor system 10 may be configured for containing any other suitable liquids and/or fluids as an auxiliary supply for the helicopter 10, including, but not limited to, water, fire suppressant, coolant, cleaning solution, etc., without departing from the scope of the presently disclosed subject matter, mutatis mutandis.

Those skilled in the art to which this invention pertains will readily appreciate that numerous changes, variations, and modifications can be made without departing from the scope of the presently disclosed subject matter, mutatis mutandis.

The invention claimed is:

1. A floor system designed for use with an aircraft, the aircraft including a cabin and an original cabin floor, the floor system being configured to be detachably installed within said cabin and overlying the original cabin floor, the floor system comprising:
    one or more bottom panels configured to match at least a portion of the original cabin floor;
    one or more top panels configured for providing, when the floor system is installed in the aircraft over the original cabin floor, a replacement cabin floor of the cabin overlying and replacing said at least portion of the original cabin floor,
    wherein said replacement cabin floor is configured for providing a similar load-carrying capacity for the aircraft as said original cabin floor,
    wherein said one or more top panels each define a general planar surface; and
    one or more fuel tanks disposed between the one or more top panels and the one or more bottom panels and defining an internal space for containing liquid fuel therewithin, the one or more fuel tanks covering substantially the entire said original cabin floor and fastened to the cabin via a restraining device, at least one of said one or more fuel tanks being configured for connection to an auxiliary fuel port of the aircraft for enabling supplying said fuel to the aircraft;
    wherein the floor system comprises a height, a width and a length, wherein said height is less than said width, and wherein said height is less than said length; and
    wherein said height is independent of a level of fuel accommodated in the tank.

2. The floor system according to claim 1, further comprising two or more of said one or more fuel tanks, said one or more fuel tanks being configured to be connected to one another such that contents thereof are in fluid communication.

3. The floor system according to claim 1, further comprising a connection arrangement configured to cooperate with the auxiliary fuel port to operationally connect the floor system thereto, thereby facilitating the supply of fuel.

4. The floor system according to claim 3, wherein said connection arrangement comprises a conduit extending therefrom.

5. The floor system according to claim 3, wherein said connection arrangement comprises a pump configured to force fuel contained within the floor system toward said auxiliary fuel port.

6. The floor system according to claim 1, wherein one or more of the one or more fuel tanks comprises an inner liner configured to self-seal in event of puncture.

7. The floor system according to claim 1, wherein said one or more top panels comprises at least one armor layer.

8. The floor system according to claim 1, said one or more bottom panels comprising at least one armor layer.

9. The floor system according to claim 7, wherein said at least one armor layer comprises a plurality of elements made of a refractory material.

10. The floor system according to claim 7, wherein said at least one armor layer comprises a layer made of a material configured for providing ballistic protection.

11. The floor system according to claim 1, wherein an interior of each of at least some of said one or more fuel tanks comprises a plurality of partitions, dividing the interior into sections.

12. The floor system according to claim 5, wherein said connection arrangement is configured to determine an amount of fuel drawn from the one or more fuel tanks.

13. The floor system according to claim 1, further comprising a controller configured to direct operation of the floor system.

14. The floor system according to claim 1, wherein said height does not exceed one quarter of said width.

15. The floor system according to claim 1, wherein said height does not exceed about 15% of a cabin height of the cabin.

16. A method of loading an aircraft with fuel and personnel, the aircraft including a cabin characterized by a first capacity defined by a number of personnel in a predetermined position which may be accommodated therein, the aircraft further including an auxiliary fuel port disposed within said cabin, the method comprising:
    (a) providing a floor system designed for use with the aircraft, the aircraft including an original cabin floor, the floor system being configured to be detachably installed within said cabin and overlying the original cabin floor, the floor system comprising:
        one or more bottom panels configured to match at least a portion of the original cabin floor;
        one or more top panels configured for providing, when the floor system is installed in the aircraft over the original cabin floor, a replacement cabin floor of the cabin overlying and replacing said at least portion of the original cabin floor, wherein said replacement cabin floor is configured for providing a similar load-carrying capacity for the aircraft as said original cabin floor, wherein said one or more top panels each define a general planar surface; and one or more fuel tanks disposed between the one or more top panels and the one or more bottom panels and defining an internal space for containing liquid fuel therewithin, at least one of said one or more fuel tanks being configured for connection to an auxiliary fuel port of the aircraft for enabling supplying said fuel to the aircraft;

wherein the floor system comprises a height, a width and a length, wherein said height is less than said width, and wherein said height is less than said length; and wherein said height is independent of a level of fuel accommodated in the tank;

(b) detachably installing said floor system to a floor of the cabin;

(c) providing fuel within said fuel tanks;

(d) connecting said fuel tanks to said auxiliary fuel port; and (e) loading into said cabin a non-zero number of personnel and/or cargo;

wherein said personnel are standing and/or seated on said floor system, and/or said cargo is loaded on said floor system.

17. An aircraft including a cabin, an original cabin floor and an auxiliary fuel port, and further comprising a floor system designed for use with the aircraft, the floor system being configured to be detachably installed within said cabin and overlying the original cabin floor, the floor system comprising:

one or more bottom panels configured to match at least a portion of the original cabin floor;

one or more top panels configured for providing, when the floor system is installed in the aircraft over the original cabin floor, a replacement cabin floor of the cabin overlying and replacing said at least portion of the original cabin floor, wherein said replacement cabin floor is configured for providing a similar load-carrying capacity for the aircraft as said original cabin floor, wherein said one or more top panels each define a general planar surface; and one or more fuel tanks disposed between the one or more top panels and the one or more bottom panels and defining an internal space for containing liquid fuel therewithin, at least one of said one or more fuel tanks being configured for connection to an auxiliary fuel port of the aircraft for enabling supplying said fuel to the aircraft;

wherein the floor system comprises a height, a width and a length, wherein said height is less than said width, and wherein said height is less than said length; and wherein said height is independent of a level of fuel accommodated in the tank, wherein the floor system is detachably installed within the cabin and overlying the original cabin floor such as to provide the replacement cabin floor, and wherein at least one of said one or more fuel tanks is connected to the auxiliary fuel port.

18. The aircraft according to claim 17, wherein said cabin and said original cabin floor are characterized by a first personnel capacity, said first personnel capacity being defined by a maximum number of personnel that can be accommodated in the cabin and supported by the original cabin floor in a predetermined position, and wherein the cabin with the floor system installed therein including the replacement floor is characterized by a second said capacity, said second capacity being equal to said first capacity.

19. The aircraft according to claim 18, wherein said predetermined position is a sitting position.

20. The aircraft according to claim 17, wherein the auxiliary fuel port is located within the cabin.

21. The aircraft according to claim 17, wherein said aircraft is a helicopter.

22. The aircraft according to claim 17, wherein said original cabin floor is configured for supporting a predetermined maximum number of personnel, and wherein said replacement cabin floor is configured for supporting thereon up to said predetermined maximum number of personnel.

23. The floor system according to claim 1, wherein the one or more top panels are fixed spaced uniformly from the bottom panels at said height.

24. The floor system according to claim 1, wherein the one or more top panels are oriented in a parallel manner with respect to the original cabin floor.

25. The floor system according to claim 1, wherein each of the one or more fuel tanks include internal partitions.

26. The floor system according to claim 1, wherein said one or more fuel tanks are formed with a passageway passing therethrough to provide access to a portion of the original cabin floor in registration with the passageway when the floor system is installed om the original cabin floor.

27. The aircraft according to claim 17, wherein said height of the floor system does not exceed about 15% of a cabin height of the cabin.

28. A floor system designed for use with an aircraft, the aircraft including a cabin and an original cabin floor, the floor system being configured to be detachably installed within said cabin and overlying the original cabin floor, the floor system comprising:

a plurality of modular fuel tanks defining an internal space for containing liquid fuel therewithin, at least one of said plurality of modular fuel tanks being configured for connection to an auxiliary fuel port of the aircraft for enabling supplying said fuel to the aircraft;

wherein one or more of the modular fuel tanks of said plurality of fuel tanks can be selectively installed on the cabin floor to provide a corresponding variable fuel capacity;

wherein each one of the modular fuel tanks is configured to be connected to another said modular fuel tank such that contents of both said modular fuel tanks when thus connected are in fluid communication with one another;

the plurality of modular fuel tanks including one or more bottom panels configured to match at least a portion of the original cabin floor;

the plurality of modular fuel tanks including one or more top panels configured for providing, when the floor system is installed in the aircraft over the original cabin floor, a replacement cabin floor of the cabin overlying and replacing said at least portion of the original cabin floor, wherein said replacement cabin floor is configured for providing a similar load-carrying capacity for the aircraft as said original cabin floor,
wherein said one or more top panels each define a general planar surface; and
wherein the floor system comprises a height, a width and a length, wherein said height is less than said width, and wherein said height is less than said length; and
wherein said height is independent of a level of fuel accommodated in the tank.

29. The floor system according to claim 28, wherein said plurality of modular fuel tanks include at least three modular fuel tanks including a rearmost fuel tank, a middle fuel tank, and a frontmost fuel tank.

30. The floor system according to claim 29, wherein the plurality of modular fuel tanks are configured for being installed on the cabin floor according to any one of the following combinations:
   (a) only the rearmost fuel tank;
   (b) the middle fuel tank and the rearmost fuel tank only, wherein the middle fuel tank is connected to and in fluid communication with the rearmost fuel tank;
   (c) all of the frontmost fuel tank, the middle fuel tank and the rearmost fuel tank, wherein the middle fuel tank is connected to and in fluid communication with the rearmost fuel tank, and wherein the middle fuel tank is connected to and in fluid communication with the frontmost fuel tank.

31. The floor system according to claim 28, comprising a restraint mechanism configured for enabling cargo to be restrained on the floor system.

32. A method of increasing fuel capacity of an aircraft, the aircraft including a cabin and an auxiliary fuel port disposed within said cabin, the method comprising:
   (a) providing a floor system as defined in claim 28;
   (b) detachably installing one or more of said modular fuel tanks to the original cabin floor.

33. The method according to claim 32, wherein said plurality of modular fuel tanks include at least three module fuel tanks including a rearmost fuel tank, a middle fuel tank, and a frontmost fuel tank; and
wherein step (b) includes detachably installing on the cabin floor one or more of the modular fuel tanks according to any one of the following combinations:
   (i) detachably installing on the cabin floor only the rearmost fuel tank;
   (ii) detachably installing on the cabin floor the middle fuel tank and the rearmost fuel tank only, wherein the middle fuel tank is connected to and in fluid communication with the rearmost fuel tank;
   (iii) detachably installing on the cabin floor all of the frontmost fuel tank, the middle fuel tank and the rearmost fuel tank, wherein the middle fuel tank is connected to and in fluid communication with the rearmost fuel tank, and wherein the middle fuel tank is connected to and in fluid communication with the frontmost fuel tank.

34. The method according to claim 32, further including:
   (c) providing fuel within said modular fuel tanks;
   (d) connecting said fuel tanks to said auxiliary fuel port.

\* \* \* \* \*